(12) United States Patent
Koike

(10) Patent No.: US 11,507,833 B2
(45) Date of Patent: Nov. 22, 2022

(54) IMAGE RECOGNITION APPARATUS

(71) Applicant: TOYOTA JIDOSHA KABUSHIKI KAISHA, Toyota (JP)

(72) Inventor: Shin Koike, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 16/833,957

(22) Filed: Mar. 30, 2020

(65) Prior Publication Data

US 2020/0394515 A1 Dec. 17, 2020

(30) Foreign Application Priority Data

Jun. 14, 2019 (JP) .............................. JP2019-110843

(51) Int. Cl.
*G06N 3/08* (2006.01)
*B60W 30/08* (2012.01)
*G06V 20/58* (2022.01)

(52) U.S. Cl.
CPC .............. *G06N 3/08* (2013.01); *B60W 30/08* (2013.01); *G06V 20/58* (2022.01)

(58) Field of Classification Search
CPC combination set(s) only.
See application file for complete search history.

(56) References Cited

U.S. PATENT DOCUMENTS

| | | | |
|---|---|---|---|
| 9,430,840 B1 | 8/2016 | Tian et al. | |
| 9,898,669 B2 | 2/2018 | Nishijima | |
| 10,339,393 B2 | 7/2019 | Masui et al. | |
| 10,427,689 B2 | 10/2019 | Tokimasa et al. | |
| 10,486,698 B2 | 11/2019 | Masui et al. | |
| 10,731,996 B2 | 8/2020 | Naito | |
| 10,922,561 B2 | 2/2021 | Ozawa et al. | |
| 11,072,328 B2 | 7/2021 | Masui et al. | |
| 11,235,766 B2 | 2/2022 | Masui et al. | |
| 2007/0140527 A1 | 6/2007 | Yamamoto et al. | |

(Continued)

FOREIGN PATENT DOCUMENTS

| JP | 2007172035 A | 7/2007 |
|---|---|---|
| JP | 2010128744 A | 6/2010 |

(Continued)

OTHER PUBLICATIONS

Fuentes A., Yoon S., Park D.S.: Visual Scene Segmentation using Optical Flow Field from dynamic environment. In: KISM Conference, Apr. 2016, 73-76.

(Continued)

*Primary Examiner* — Cindy Trandai
(74) *Attorney, Agent, or Firm* — Dickinson Wright, PLLC

(57) ABSTRACT

An image recognition apparatus includes a controller. The controller is configured to perform positional detection and identification for the target in each of the frame images, and extract a first target having an ambience change feature with priority over a second target that does not have the ambience change feature. The ambience change feature is a feature about a positional change of the target that is exhibited when the ambience is photographed from a moving object. The positional change is a positional change of the target identified in common among the frame images.

11 Claims, 8 Drawing Sheets

(56) References Cited

U.S. PATENT DOCUMENTS

| | | | | |
|---|---|---|---|---|
| 2007/0222877 | A1* | 9/2007 | Ku | H04N 5/3454 |
| | | | | 348/E3.02 |
| 2009/0069973 | A1* | 3/2009 | Li | G08G 1/167 |
| | | | | 701/31.4 |
| 2010/0271484 | A1* | 10/2010 | Fishwick | H04N 5/145 |
| | | | | 348/169 |
| 2013/0182896 | A1* | 7/2013 | Azuma | G06V 20/56 |
| | | | | 382/103 |
| 2015/0154317 | A1* | 6/2015 | Inoue | G06F 16/56 |
| | | | | 711/108 |
| 2015/0243043 | A1* | 8/2015 | Guan | B60W 30/09 |
| | | | | 348/148 |
| 2017/0262750 | A1 | 9/2017 | Kozuka et al. | |
| 2018/0165527 | A1* | 6/2018 | Park | G06T 7/248 |
| 2018/0365839 | A1* | 12/2018 | Feng | G06T 7/11 |
| 2019/0035125 | A1* | 1/2019 | Bellows | G06K 9/6274 |
| 2019/0206065 | A1* | 7/2019 | Ju | G06K 9/6267 |
| 2019/0362163 | A1* | 11/2019 | Siegemund | G06V 10/757 |
| 2019/0378283 | A1* | 12/2019 | Boult | G06T 7/254 |

FOREIGN PATENT DOCUMENTS

| | | |
|---|---|---|
| JP | 2016004446 A | 1/2016 |
| JP | 2017162438 A | 9/2017 |
| JP | 2019009615 A | 1/2019 |

OTHER PUBLICATIONS

Sistu G., Leang I., Chennupati S., Milz S., Yogamani S., Rawashdeh S.: NeurAll: Towards a Unified Model for Visual Perception in Automated Driving. In: IEEE Intelligent Transportation Systems Conference, Feb. 2019, 1-8.

Mishra P.K., Saroha G.P.: A Study on Classification for Static and Moving Object in Video Surveillance System. In: International Journal of Image, Graphics and Signal Processing, 2016, 76-82.

Shuichi Enokida, Masatomo Ishikura, "Risk Estimation Using Video Information from Videos of Drive Recorder," [online], May 2016, https://www.jsdc.or.jp/Portals/0/pdf/library/jyosei/h27_21605_kyutech.pdf.

Partial Translation of Office Action Issued to JP2019-110843.

* cited by examiner ($\alpha = 0.1$)

($\alpha = 1.0$)

IMAGE RECOGNITION APPARATUS

INCORPORATION BY REFERENCE

The disclosure of Japanese Patent Application No. 2019-110843 filed on Jun. 14, 2019 including the specification, drawings and abstract is incorporated herein by reference in its entirety.

BACKGROUND

1. Technical Field

The present disclosure relates to an image recognition apparatus configured to recognize a target from time-series frame images.

2. Description of Related Art

There is known an apparatus configured to recognize objects around a vehicle based on images obtained by photographing an ambience with an on-board camera and assist driving based on recognition information. For example, Japanese Unexamined Patent Application Publication No. 2017-162438 (JP 2017-162438 A) proposes a danger predictor configured such that a neural network acquires an input image captured by an on-board camera and estimates a dangerous area in the input image and features in the dangerous area.

For example, You Only Look Once (YOLO) and Single Shot Multibox Detector (SSD) are known as methods for detecting the position of an object in an input image and identifying the object (identifying what the object is) through image processing.

SUMMARY

If an object in an input image is recognized from the image and if the positional detection accuracy and the identification accuracy for the recognized object (hereinafter referred to as a target) are low, there is a possibility that a control system to be implemented by using an image recognition result cannot be operated appropriately. Therefore, it is desirable to improve target recognition accuracy.

The present disclosure provides a technology for improving the target recognition accuracy.

A first aspect of the present disclosure relates to an image recognition apparatus. The image recognition apparatus is configured to extract a target in time-series frame images through image processing for the frame images and output target information related to the target. The frame images is obtained by photographing an ambience from a moving object. The image recognition apparatus includes a controller configured to: perform positional detection and identification for the target in each of the frame images; and extract a first target having an ambience change feature with priority over a second target that does not have the ambience change feature. The ambience change feature is a feature about a positional change of the target that is exhibited when the ambience is photographed from the moving object. The positional change is a positional change of the target identified in common among the time-series frame images.

The image recognition apparatus of the first aspect is configured to extract a target in time-series frame images through image processing for the frame images and output target information related to the extracted target. The frame images are obtained by photographing an ambience from a moving object such as a vehicle. The extraction of the target means that the target recognized in the frame images is selected to output its target information. Thus, the extracted target is a target recognized by the image recognition apparatus, and target information related to the target is output from the image recognition apparatus.

The image recognition apparatus of the first aspect includes the controller. The controller is configured to perform positional detection and identification (identification as to what the target is) for the target in each of the frame images.

When the controller correctly recognizes the target in each of the frame images (the positional detection and the identification are appropriate), the positional change of the target identified in common among the frame images has a feature exhibited when the ambience is photographed from the moving object. When the target cannot be recognized correctly, the positional change of the target identified in common among the frame images does not have the feature exhibited when the ambience is photographed from the moving object.

Therefore, the controller is configured to extract the first target having the ambience change feature with priority over the second target that does not have the ambience change feature. The ambience change feature is a feature about a positional change of the target that is exhibited when the ambience is photographed from the moving object. The positional change is a positional change of the target identified in common among the time-series frame images. The image recognition apparatus is configured to set the extracted target as a target recognized by the image recognition apparatus and output target information related to the target.

According to the first aspect, the target recognition accuracy of the image recognition apparatus can be improved.

In the first aspect, the ambience change feature may include a feature of a change in a size of the target in addition to the feature of the positional change of the target.

The ambience change feature is exhibited also in the change in the size of the target. Therefore, in the first aspect of the present disclosure, the ambience change feature includes the feature of the change in the size of the target in addition to the feature of the positional change of the target. According to the configuration described above, the target recognition accuracy can further be improved.

In the first aspect, the ambience change feature may include a feature that a positional change between the frame images is equal to or smaller than a predetermined amount for a target recognized at a position near a vanishing point of a motion vector.

The vanishing point of the motion vector is a point where straight lines of a plurality of motion vectors intersect each other. Thus, the target recognized at the position near the vanishing point of the motion vector has a small positional change between the frame images. According to the configuration described above, the target recognition accuracy can further be improved because the ambience change feature includes the feature described above.

In the first aspect, the ambience change feature may include a feature that the target identified in common moves along a straight line. The ambience change feature may include a feature that the target identified in common among the frame images moves along a straight line connecting the target in an arbitrary frame image and a vanishing point of a motion vector.

When the target is correctly recognized in each of the frame images (the positional detection and the identification are appropriate), the target identified in common among the frame images moves along a straight line passing through the vanishing point of the motion vector. According to the configuration described above, the target recognition accuracy can further be improved because the ambience change feature includes the features described above.

In the first aspect, the ambience change feature may include a feature that a change in a movement interval of the target identified in common has a predetermined regularity. The ambience change feature may include a feature that a change in a size of the target identified in common has a predetermined regularity.

When the target is correctly recognized in each of the frame images (the positional detection and the identification are appropriate), the target identified in common among the frame images moves along a straight line. At this time, the change in the movement interval of the target has the predetermined regularity. Further, the change in the size of the target has the predetermined regularity. Examples of the regularity include a regularity that the change rate of the movement interval of the target is constant, and a regularity that the change rate of the size of the target is constant. According to the configuration described above, the target recognition accuracy can further be improved because the ambience change feature includes the features described above.

In the first aspect, the controller may include a neural network configured to recognize the target by using information on the time-series frame images. The neural network may be configured to learn through deep learning such that the first target having the ambience change feature is extracted with priority over the second target that does not have the ambience change feature.

For example, a recurrent neural network may be used as the neural network configured to process the plurality of frame images in time series.

According to the configuration described above, the neural network can learn the target recognition by using the plurality of time-series frame images. For example, the neural network can learn a motion of the target having the ambience change feature through the deep learning by using the time-series frame images. Thus, the first target having the ambience change feature can be extracted with priority over the second target that does not have the ambience change feature. The time-series frame images for use in the learning need not be a moving image, but may be frame images to be processed in predetermined order.

In the first aspect, when the neural network learns through the deep learning, an error to be output from a loss function for updating a synaptic weight in the neural network may be adjusted to be smaller in the first target having the ambience change feature than the second target that does not have the ambience change feature.

When the neural network learns, a value estimated by the neural network and a correct value are input to the loss function, and the loss function calculates an error that increases as a difference therebetween increases. Calculation is made to obtain an update amount of the synaptic weight in the neural network, which increases as the error increases. Thus, the estimated value of the neural network is closer to the correct value.

According to the configuration described above, the neural network can be trained such that the first target having the ambience change feature is extracted more easily than the second target that does not have the ambience change feature.

In the first aspect, the controller may be configured to input the time-series frame images obtained by photographing the ambience from the moving object, set, as a target for the image processing, a frame image extracted at a predetermined sampling interval from the input frame images, and adjust the sampling interval such that the sampling interval increases as a moving speed of the moving object decreases.

According to the configuration described above, a delay in target detection can be prevented while reducing a calculation load of the image processing.

In the first aspect, the moving object may be a vehicle.

A second aspect of the present disclosure relates to an image recognition apparatus. The image recognition apparatus includes a controller. The controller is configured to: perform positional detection and identification for a target in each of time-series frame images obtained by photographing an ambience from a moving object; extract the target in the frame images through image processing for the frame images, the controller being configured to extract a first target having an ambience change feature with priority over a second target, the ambience change feature being a feature about a positional change of the target that is needed for the target identified by the controller to be estimated as a common target among the time-series frame images when the ambience is photographed from the moving object. The controller is configured to output target information related to the target.

In the second aspect, the moving object may be a vehicle.

According to the second aspect, the target recognition accuracy of the image recognition apparatus can be improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An image recognition apparatus according to an embodiment of the present disclosure is described below with reference to the drawings.

Figure 1:
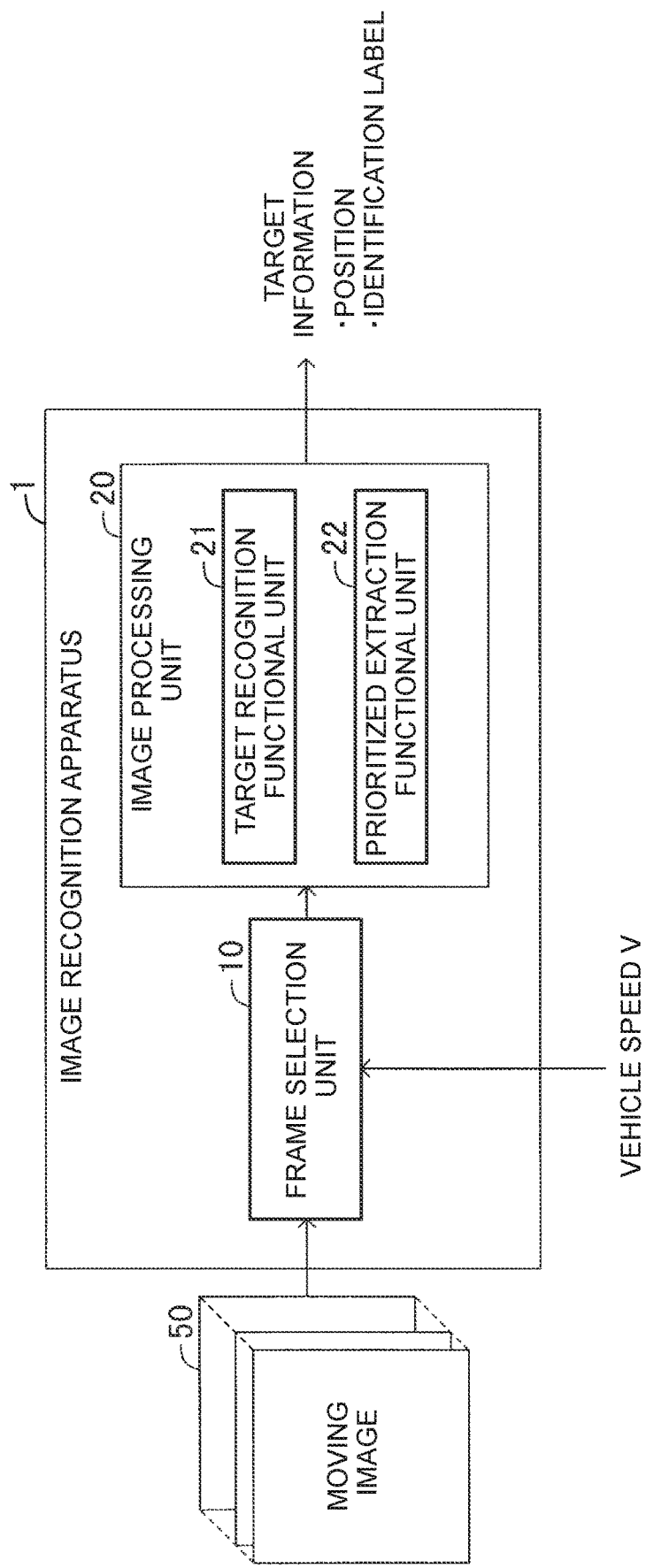
FIG. 1 is a functional block diagram of an image recognition apparatus according to an embodiment.

FIG. 1 is a functional block diagram of the image recognition apparatus according to the embodiment of the present disclosure. An image recognition apparatus 1 includes a microcomputer as a main component (controller). The image recognition apparatus 1 includes a frame selection unit 10 and an image processing unit 20.

The frame selection unit 10 inputs a moving image 50, that is, time-series successive frame images, selects frame images sampled at predetermined intervals from the input frame images, and supplies the selected frame images to the image processing unit 20. For example, if the sampling interval is n, the frame selection unit 10 extracts every n-th frame images from time-series frame images, and supplies the extracted frame images to the image processing unit 20. Thus, a plurality of frame images captured at equal time intervals are input to the image processing unit 20 in order of image capturing.

The image processing unit 20 recognizes an object in frame images through image processing using a neural network (artificial intelligence model), and outputs information indicating the position of the recognized object (hereinafter referred to as a target) and information indicating what the target is.

The image processing unit 20 functionally includes a target recognition functional unit 21 and a prioritized extraction functional unit 22. The prioritized extraction functional unit 22 is incorporated to improve the target recognition accuracy of the image recognition apparatus 1.

The image recognition apparatus 1 of this embodiment is used in a system configured to control a vehicle while monitoring ambient conditions around the vehicle (for example, a driving assistance system or an autonomous driving system). Examples of targets to be recognized by the target recognition functional unit 21 include an automobile, a bicycle, a pedestrian, a traffic sign, and a traffic light, which are predetermined targets to be recognized by the vehicle control system.

The target recognition functional unit 21 recognizes a target in each frame image supplied from the frame selection unit 10 by using a neural network trained through deep learning, and generates positional information indicating the position of the recognized target and an identification label indicating what the target is. The positional information and the identification label of the target are referred to collectively as target information.

The target information includes the following information. For example, the target information includes information indicating whether a predetermined number of grid areas defined in a frame image each represent an object, information indicating, if the grid areas represent an object, four corners of a rectangle that represents the object, and an identification label indicating what the object is (likeness of the object). The identification label includes information for identifying the type of a target, and information indicating a probability that the target can be estimated as an object of this type (showing likeness of the object). For example, the identification label is information indicating that the type of a recognized target is a traffic sign indicating a speed limit of 60 km/h and its probability is 0.8 (80%).

A predetermined method (for example, You Only Look Once (YOLO) or Single Shot Multibox Detector (SSD)) may be employed as a method for detecting the position of a target and identifying the target from a frame image. For example, YOLO is a method for detecting the position of a target and identifying the target by inputting the entire frame image to a convolutional neural network.

Those methods are intended to recognize a target in a frame image alone, but are not solely good in terms of target recognition accuracy. A desired accuracy is difficult to obtain particularly in the detection of a recognition position. Further, some types of target such as a traffic sign may be difficult to identify.

An object in a moving image obtained by photographing an ambience from a traveling vehicle exhibits a characteristic motion between frame images. When a motion of a target between frame images is grasped as the characteristic motion, it can be estimated that the target is recognized correctly. The prioritized extraction functional unit 22 improves the recognition accuracy of the image recognition apparatus 1 by extracting a target that exhibits the characteristic motion with priority among the targets recognized by the target recognition functional unit 21.

The feature of the motion of the target is hereinafter referred to as an ambience change feature.

The ambience change feature is set as follows.

1. A target near a vanishing point has a small positional change between frame images.
2. The target moves along a straight line connecting the vanishing point and the target.
3. The motion of the target is smooth.

The position of the target changes linearly.

Changes in a movement interval of the target are constant between frame images.

Changes in the size of the target are constant between frame images.

Figure 3:
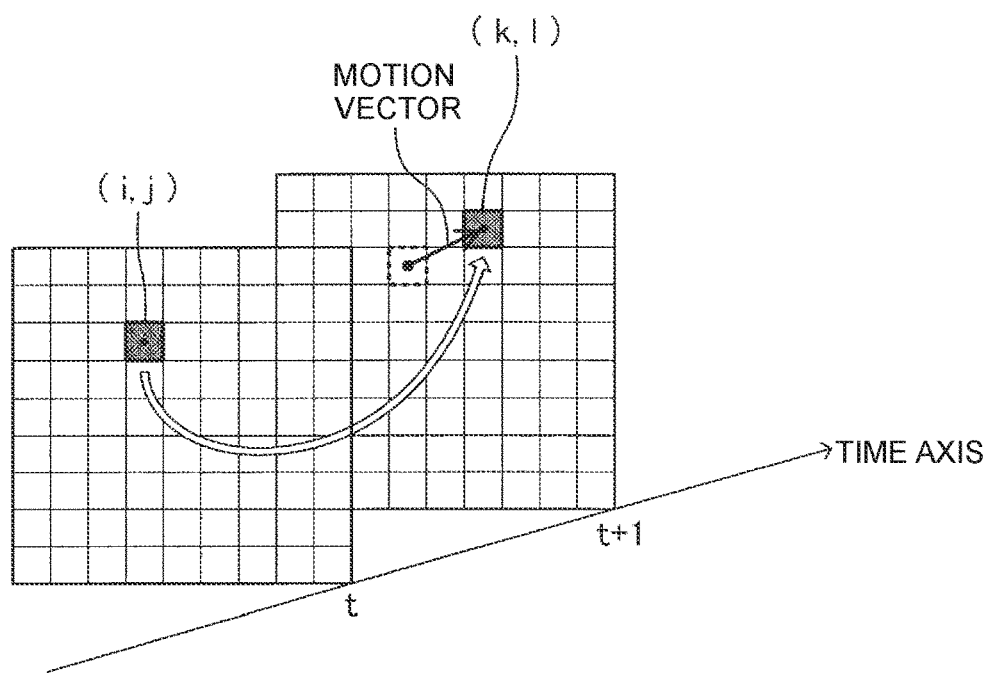
FIG. 3 is an explanatory drawing of a motion vector.
Figure 4:
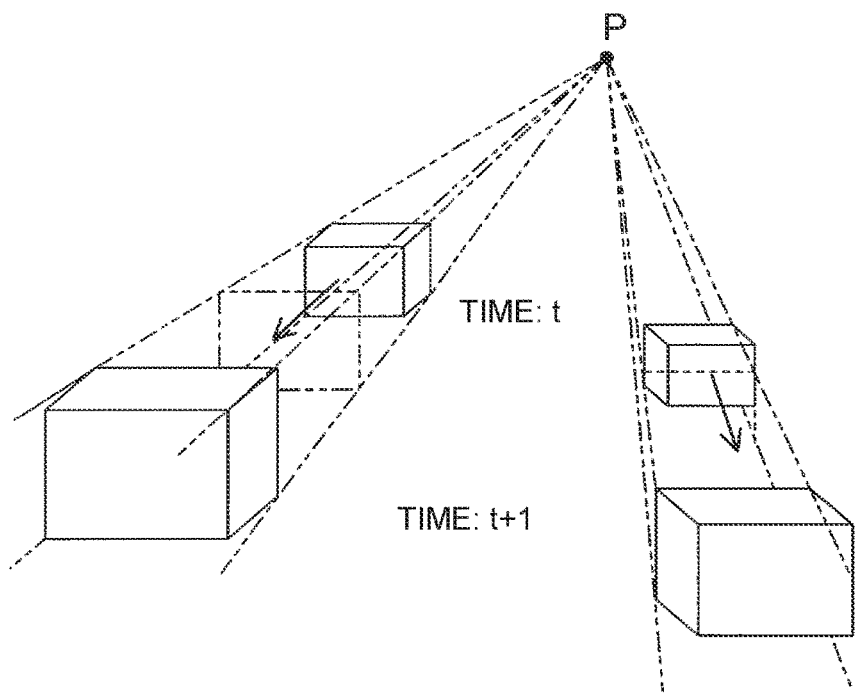
FIG. 4 is an explanatory drawing of a vanishing point of motion vectors.
Figure 5A:
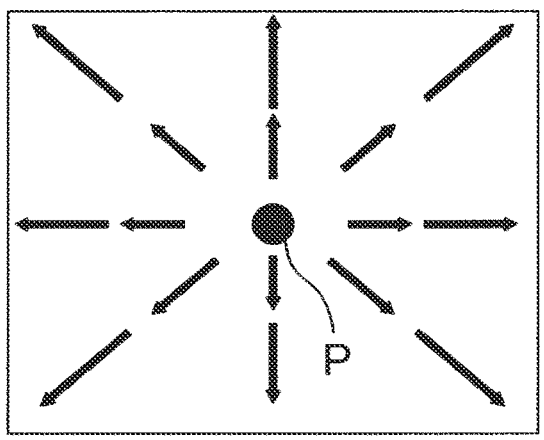
FIG. 5A is an explanatory drawing of the vanishing point of the motion vectors.
Figure 5B:
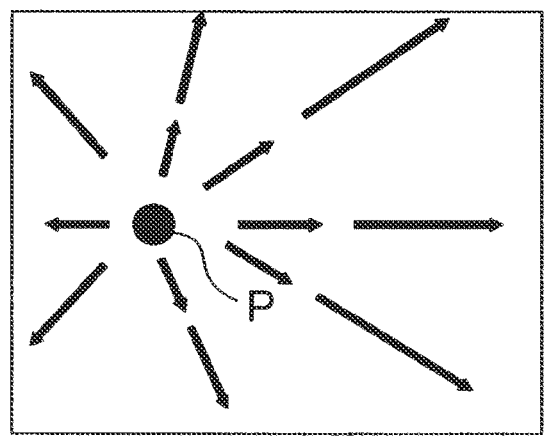
FIG. 5B is an explanatory drawing of the vanishing point of the motion vectors.

The "vanishing point" herein refers to a vanishing point of motion vectors. For example, when an arbitrary pixel of interest (i, j) moves to a different place (k, l) in a different frame image as illustrated in FIG. 3, a vector indicating the movement is a motion vector of the pixel of interest. In a moving image (time-series frame images) obtained by photographing an ambience from a traveling vehicle, a point P where straight lines of motion vectors intersect each other is determined as illustrated in FIG. 4, FIG. 5A, and FIG. 5B. The point P is a vanishing point of the motion vectors. FIG. 5A illustrates a vanishing point P when the vehicle is traveling straightforward. FIG. 5B illustrates a vanishing point P when the vehicle is turning to the left.

Positional information of a target is represented by four corners of the target. Thus, a positional change of the target may be regarded as, for example, a change in a central position of the target. The size of the target may be regarded as an area defined by the four corners of the target.

When objects in an ambience are recognized from a moving image of the ambience photographed by an on-board camera and when motions of a target recognized in respective frame images (changes in the position of the target between frame images) exhibit an ambience change feature, the target recognized in the frame images can be estimated as a common target (same target). Thus, the target recognized in the frame images can be estimated as a correctly recognized target.

For example, a target located near a vanishing point and having a small motion between frame images can be estimated as a common target (same target) (ambience change feature 1).

When a target recognized in an arbitrary frame image is located on a straight line connecting a vanishing point and the target recognized in a different frame image, the target recognized in the frame images can be estimated as a common target (same target) (ambience change feature 2).

When the position of the recognized target smoothly changes between frame images, the target recognized in the frame images can be estimated as a common target (same target) (ambience change feature 3). For example, when the target changes so as to move along a straight line and the change rate of a movement interval of the target or the change rate of the size of the target is constant, the target recognized in the frame images can be estimated as a common target (same target) (ambience change feature 3).

In the ambience change feature 3, it is only necessary that the change in the movement interval of the target or the change in the size of the target have a predetermined regularity. For example, the target recognized in the frame images may be regarded as a common target (same target) also when the change amount of the movement interval of the target or the change amount of the size of the target is constant. That is, the target may be regarded as a correctly recognized target.

Figure 6:
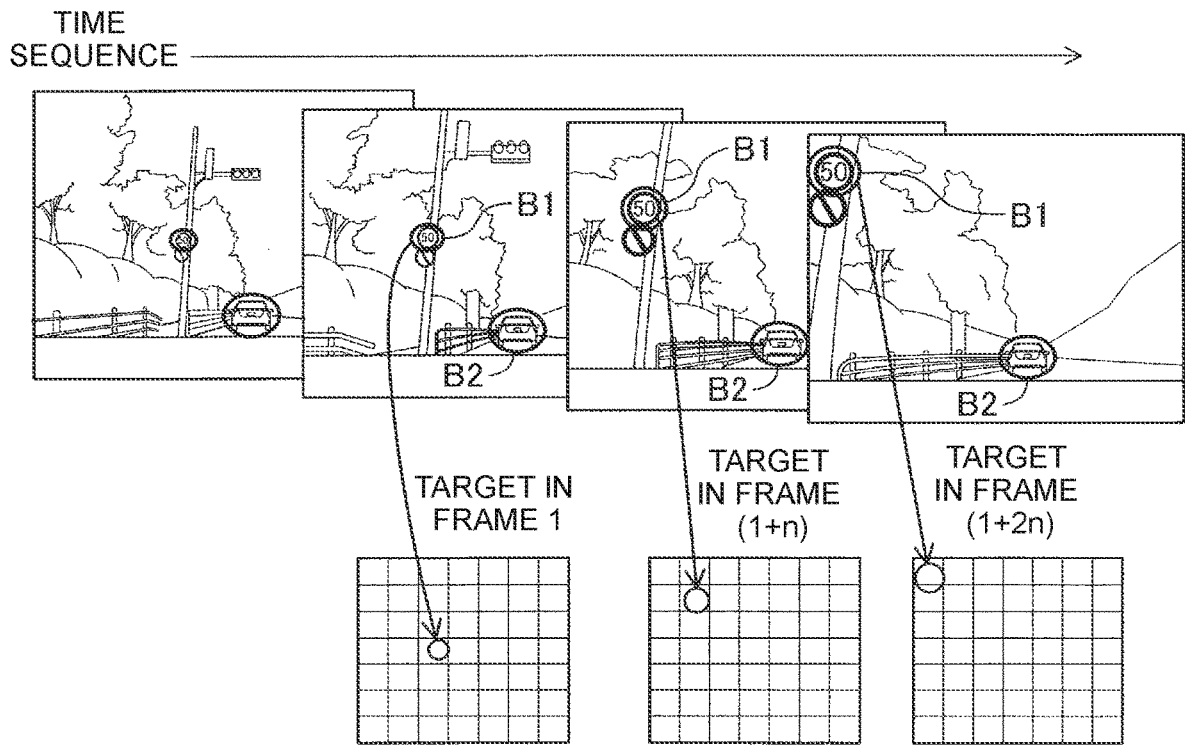
FIG. 6 is an explanatory drawing of time-series frame images and positional changes of a target.

FIG. 6 illustrates frame images obtained by photographing an area ahead of a vehicle with an on-board camera. The frame images are sequentially read at the sampling intervals n. Focusing on the position of a traffic sign (referred to as a target B1) in the frame images, the target B1 recognized in a frame image having a frame number 1, the target B1 recognized in a frame image having a frame number (1+n), and the target B1 recognized in a frame image having a frame number (1+2n) are located substantially collinearly. That is, the targets B1 are located substantially collinearly in a projection of the three superimposed frame images.

A change in the movement interval of the target B1 and a change in the size of the target B1 have predetermined regularities. That is, the movement interval and the size of the target B1 increase with increasing distance from a vanishing point of motion vectors. The target B1 in an arbitrary frame image is located on a straight line connecting the vanishing point of the motion vectors and the position of the target B1 in a different frame image. Thus, the target B1 satisfies the ambience change features 2 and 3.

A preceding vehicle (referred to as a target B2) traveling ahead of the vehicle of interest has a small positional change between the frame images. This is because the target B2 is located near the vanishing point. Thus, the target B2 satisfies the ambience change feature 1.

The targets that satisfy any one of the ambience change features 1 to 3 can be estimated as correctly recognized targets.

Next, description is given of a method for grasping a motion (positional relationship) of a target between frame images. For example, the prioritized extraction functional unit 22 handles frame images supplied from the frame selection unit 10 such that a predetermined number of frame images arranged in the order of supply (order of input) are defined as one set. In this case, the predetermined number is three. Thus, a motion (positional relationship) of a target between the frame images of one set (three frame images) can be grasped when pieces of positional information of the targets assigned a common identification label are known in the respective frame images.

In this case, the target recognition functional unit 21 completes positional detection of the target and assignment of the identification label to the target. For example, YOLO or SSD may be used for the positional detection of the target and assignment of the identification label to the target in a single frame image.

Figure 7:
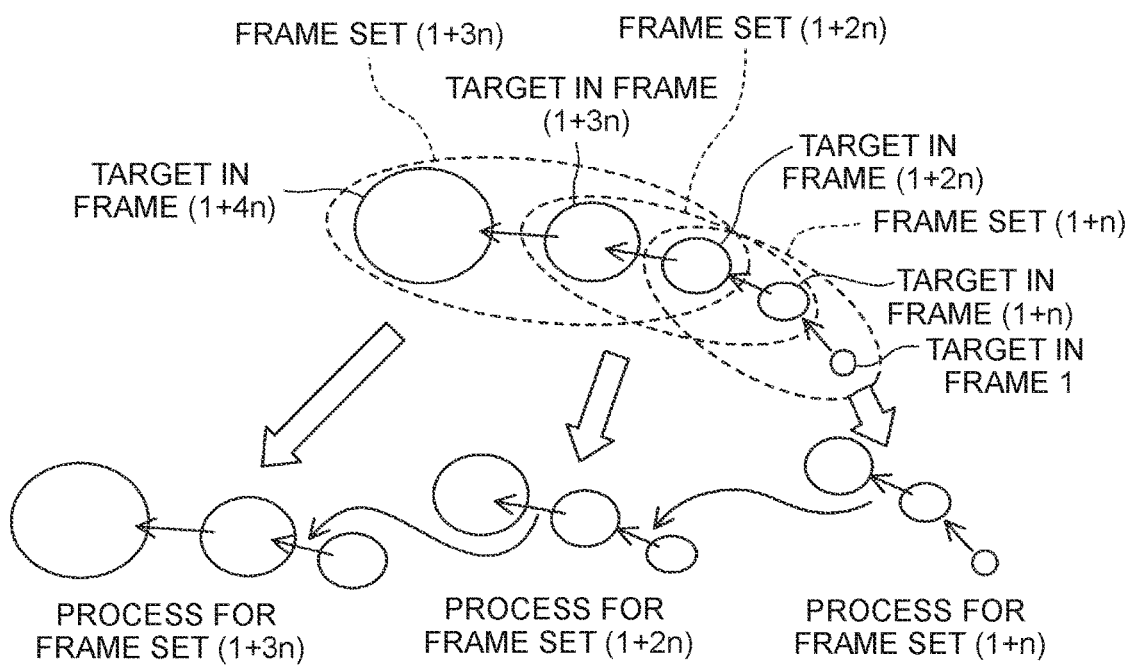
FIG. 7 is an explanatory drawing of a process of detecting positional relationships of a target.

For example, when the sampling interval of frame images to be sampled by the frame selection unit 10 is n (>1) and a predetermined number is three, a frame 1 that is a first input frame image, a frame (1+n) that is a (1+n)th frame image, and a frame (1+2n) that is a (1+2n)th frame image are defined as one frame set as illustrated in FIG. 7. The three frame images that constitute the frame set are hereinafter referred to as target frames. The frame set is identified by using the number of a middle (second) frame out of the three target frames. In this example, a frame set (1+n) is set firstly. The number of target frames that constitute the frame set is not limited to three, but may be set arbitrarily.

The prioritized extraction functional unit 22 links targets recognized in the target frames of the frame set (1+n) and having a common identification label, and acquires positional relationships of the linked targets. When the prioritized extraction functional unit 22 completes acquiring the positional relationships of all the targets recognized in the target frames and having the common identification label, the prioritized extraction functional unit 22 performs a similar process for three target frames of a next frame set (1+2n) to acquire positional relationships of targets having the common identification label. The targets having the common identification label are targets that are common in terms of types in which the targets are estimated as a specific object.

When the frame set is changed to a next frame set, the prioritized extraction functional unit 22 transfers to (stores in) the next frame set an identifier (ID) for identifying the previous frame set and information on positional relationships of targets extracted in the previous frame set.

When the prioritized extraction functional unit 22 acquires the positional relationships between the targets in the target frames of the frame set (1+2n), the prioritized extraction functional unit 22 performs a similar process for three target frames of a next frame set (1+3n). By repeating the process described above, it is possible to grasp positional relationships of targets having the common identification label in every n-th frame images and further to grasp a shift of the positional relationships.

When the positional detection and the identification of a target are correct, the motion of the target between frame images exhibits an ambience change feature. When the positional detection or the identification of the target is incorrect, however, the ambience change feature is difficult to exhibit. For example, the ambience change feature is not exhibited when the identification is incorrect in a specific frame image among the frame images. The ambience change feature is not exhibited when the positional detection is incorrect in a specific frame image among the frame images. The ambience change feature is not exhibited when the targets are linked incorrectly in the frame images.

When the targets having the common identification label in the frame images have the ambience change feature in terms of their positional relationships, the prioritized extraction functional unit 22 extracts the targets with priority over targets having no ambience change feature, and causes the image recognition apparatus 1 to output target information on the extracted targets. Thus, it is possible to output information on targets that can be estimated as being recognized correctly. The prioritized extraction functional unit 22 may be configured to extract a first target that has an ambience change feature with priority over a second target that does not have the ambience change feature. The ambience change feature may be a feature about a positional change of the target that is exhibited when the ambience is photographed from the moving object. The positional change may be a positional change of the target identified in common among the time-series frame images. Moreover, the prioritized extraction functional unit 22 may be configured to extract the target in the frame images through image processing for the frame images. The prioritized extraction functional unit 22 may be configured to extract a first target that has an ambience change feature with priority over a second target. The ambience change feature may be a feature about a positional change of the target that is needed for the target identified by the target recognition means to be estimated as a common target among the time-series frame images when the ambience is photographed from the moving object The above description of the prioritized extraction functional unit 22 is given to facilitate understanding of the functions of the prioritized extraction functional unit 22. In actuality, the functions can be attained by using a neural network such as a recurrent neural network that can perform processes in consideration of preceding and succeeding pieces of time-series information and appropriately setting a learning method for the neural network.

The learning of the neural network is called deep learning. In general deep learning, an output value estimated by the neural network and a correct value of training data are input to a loss function. As a difference between the output value of the neural network and the correct value of the training data increases, an error output from the loss function is a larger value. In the deep learning, a synaptic weight between an input layer and an intermediate layer and a synaptic weight between the intermediate layer and an output layer in the neural network are updated by using backpropagation so as to minimize the error output from the loss function. By repeating this process, the estimation accuracy of the neural network is improved.

In the image recognition technology, the neural network is trained by using a learning image and annotation data paired with the learning image. The annotation data is correct data indicating what an object in the learning image is and where the object is located, that is, correct data on an identification label and a detected position. In the identification label of the correct data, the probability showing likeness of the object is 1.0.

In this case, a position loss function and an identification loss function are prepared. A position of a target estimated by the neural network and a correct position of the annotation data are input to the position loss function. An identification label of the target estimated by the neural network and a correct identification label of the annotation data are input to the identification loss function. Synaptic weights between layers in the neural network are updated by using a total error obtained by adding together the errors output from both the loss functions. In this manner, the neural network is trained.

In this embodiment, the neural network is basically trained by the learning method described above. This embodiment provides a function of adjusting the total error to be output from the loss functions depending on whether the target exhibits the ambience change feature. Therefore, the image processing unit 20 includes the recurrent neural network that recognizes a target in a frame image in consideration of preceding and succeeding pieces of time-series information. The recurrent neural network is hereinafter abbreviated as RNN.

Figure 2:
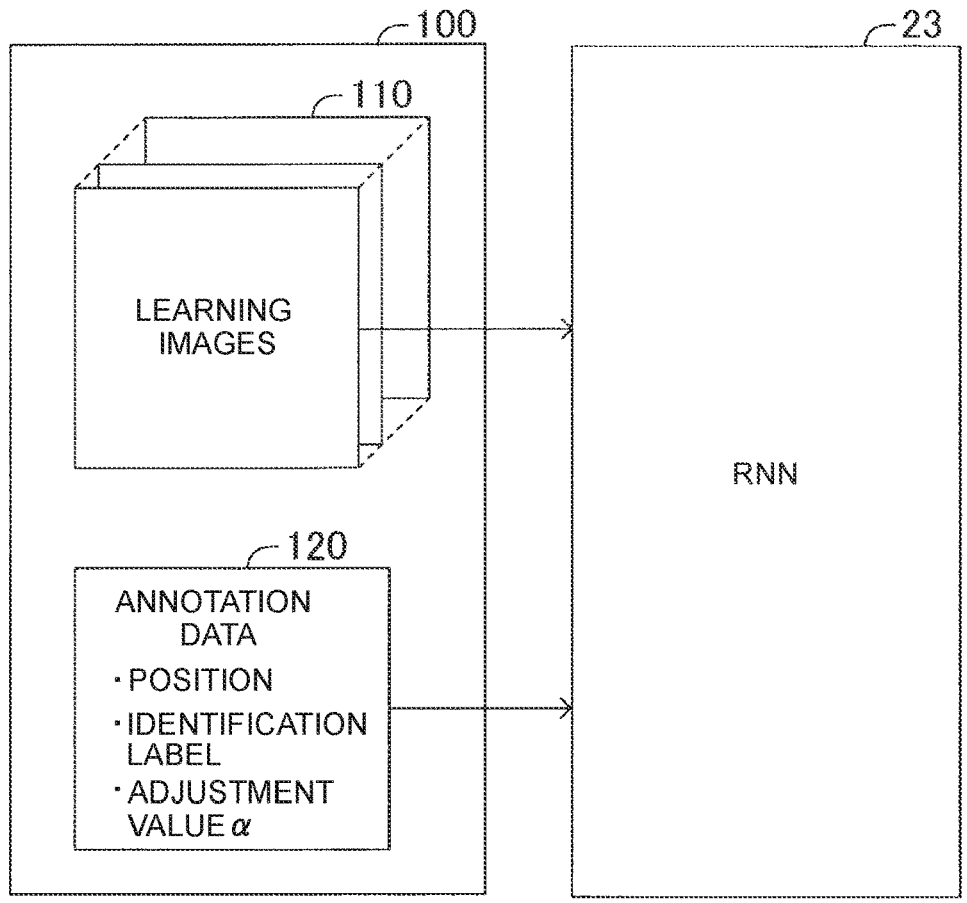
FIG. 2 is a schematic configuration diagram of a learning system for a recurrent neural network.

FIG. 2 illustrates the configuration of a learning system for an RNN 23. The RNN 23 is the recurrent neural network of the image processing unit 20. The RNN 23 is connected to a training device 100. The training device 100 stores learning images 110 and annotation data 120, and trains the RNN 23 by supplying the learning images 110 and the annotation data 120 to the RNN 23.

The annotation data 120 includes adjustment value data in addition to the correct data on a position and an identification label. The adjustment value data indicates an adjustment value $\alpha$ for adjusting errors to be output from loss functions.

The learning images 110 are a plurality of frame images including frame images in which the position of a target in the images changes with an ambience change feature when the images are input to the RNN 23 in predetermined order, and frame images in which the position of a target in the images does not change with an ambience change feature when the images are input to the RNN 23 in the predetermined order.

The adjustment value $\alpha$ is assigned to each target. The adjustment value $\alpha$ is set to a value smaller than 1.0 (for example, 0.1) in a case of a target that positionally changes with an ambience change feature when the learning images 110 are input in the predetermined order, and is set to 1.0 in a case of a target that does not positionally change with an ambience change feature when the learning images 110 are input in the predetermined order. The adjustment value $\alpha$ need not essentially be set in two levels, but may be set in three or more levels so as to have a smaller value in a case of a target that exhibits an ambience change feature more remarkably.

Figure 8:
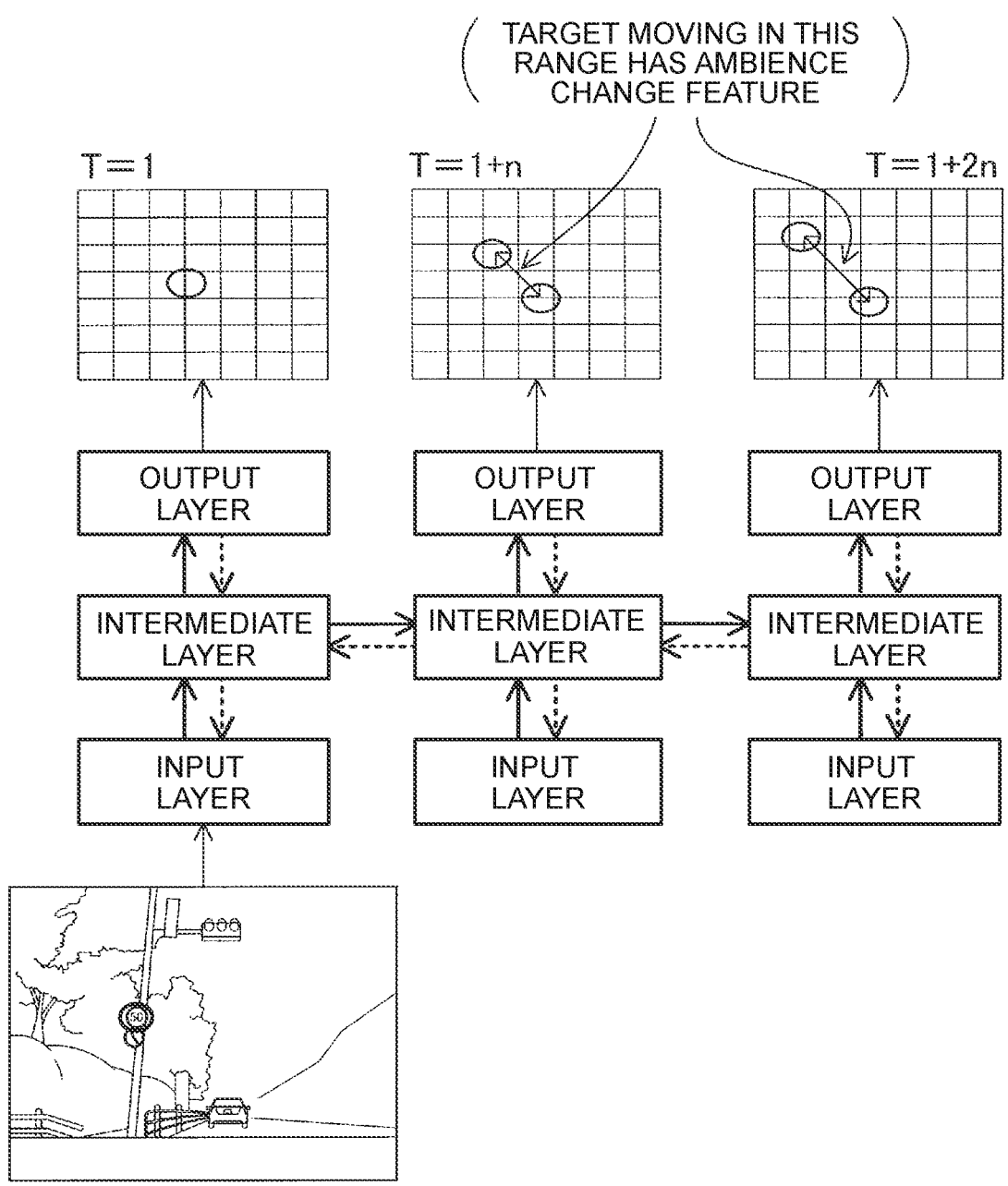
FIG. 8 is an explanatory drawing of a learning flow of the recurrent neural network.

FIG. 8 illustrates a learning flow of the RNN 23. In FIG. 8, arrows of wide continuous lines represent forward propagation, and arrows of wide dashed lines represent backpropagation. Data propagates forward along the arrows of continuous lines from Time T=1. Values of layers at each time are changing. Therefore, those values are stored. An error at each time is calculated during the forward propagation. The error at each time is a difference between an output value of the RNN 23 and a correct value. An error at every time is obtained by summing up the errors at the respective times.

In the example of FIG. 8, learning is started when forward propagation is completed for data up to Time T=1+2n. In the learning of the RNN 23, synaptic weights are updated by determining a gradient of the error so as to minimize the error similarly to deep learning of a general neural network that does not involve time-series processes. At this time, the learning is started from the output layer at Time T=1+2n in reverse chronological order. The synaptic weights are updated between the intermediate layer and the output layer, between the intermediate layer and the intermediate layer, and between the input layer and the intermediate layer.

Figure 9:
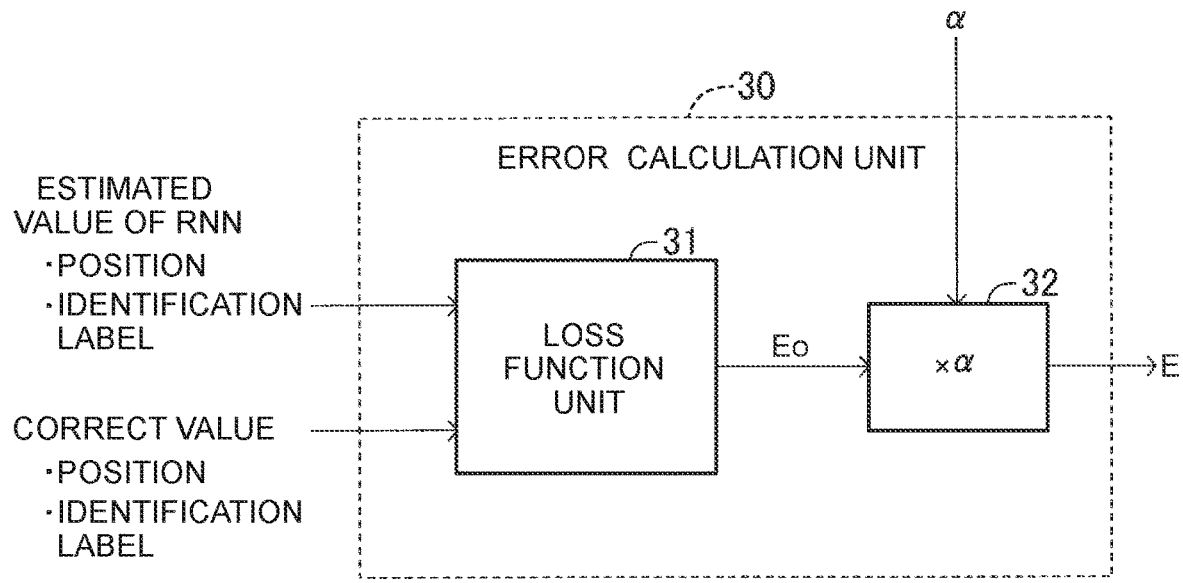
FIG. 9 is a configuration diagram of an error calculation unit.

As illustrated in FIG. 9, the RNN 23 of this embodiment includes an error calculation unit 30 configured to calculate an error for updating the synaptic weights between layers. The error calculation unit 30 includes a loss function unit 31 and an adjustment unit 32. The loss function unit 31 inputs output values of the RNN 23 and correct values of the annotation data 120 at the respective times to loss functions, and calculates an error E0 that increases as the sum of the differences between the output values of the RNN 23 and the correct values of the annotation data 120 at the respective times increases. The error E0 is referred to as a pre-adjustment error E0.

For example, the loss function unit 31 includes a position loss function and an identification loss function. A position of a target estimated by the RNN 23 and a correct position of the annotation data 120 are input to the position loss function. The loss function unit 31 calculates a position error that increases as a difference therebetween increases.

An identification label of the target (probability that the target is estimated as an object of interest) estimated by the RNN 23 and a correct identification label of the annotation data 120 are input to the identification loss function. The loss function unit 31 calculates an identification error that increases as a difference therebetween increases. For example, the identification error is maximum when the identification is incorrect (for example, the target is an automobile but is estimated as a pedestrian), and increases as a probability difference increases when the identification is correct. The loss function unit 31 outputs an error obtained by adding together the position error and the identification error. This error is the pre-adjustment error E0.

The loss function unit 31 outputs the calculated pre-adjustment error E0. The pre-adjustment error E0 is input to the adjustment unit 32. The adjustment unit 32 inputs an adjustment value α included in the annotation data 120, and calculates a post-adjustment error E by multiplying the pre-adjustment error E0 by the adjustment value α (E=E0× α). The post-adjustment error E is the error calculated by the error calculation unit 30.

As described above, the adjustment value α is set to a value smaller than 1.0 when a target in the learning images is a target having an ambience change feature, and is set to 1.0 when the target is a target having no ambience change feature.

Figure 10A:
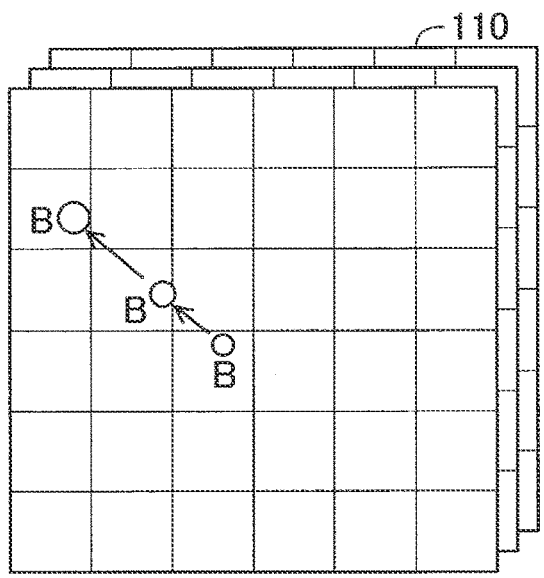
FIG. 10A is an explanatory drawing of a motion of a target.
Figure 10B:
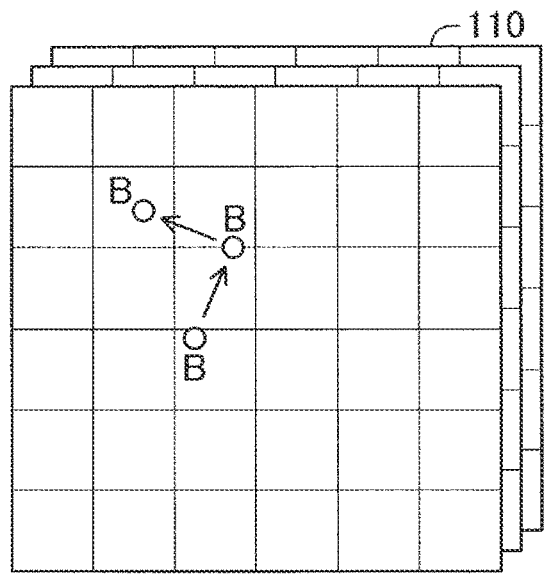
FIG. 10B is an explanatory drawing of a motion of the target.

For example, in a case of learning images in which the target B moves along a path illustrated in FIG. 10A, the target B has an ambience change feature, and therefore the adjustment value α is set to a small value (for example, 0.1). In a case of learning images in which the target B moves along a path illustrated in FIG. 10B, the target has no ambience change feature, and therefore the adjustment value α is set to 1.0.

The RNN 23 updates the synaptic weights between layers so as to minimize the post-adjustment error E. That is, backpropagation is performed.

The post-adjustment error E is adjusted to a smaller value in the target having an ambience change feature than the target having no ambience change feature. Therefore, the update amount of the synaptic weights in the backpropagation decreases. As a result, the ability to recognize the target having an ambience change feature is maintained. The post-adjustment error E is not adjusted to a small value in the target having no ambience change feature. Therefore, the update amount of the synaptic weights in the backpropagation does not decrease. Thus, the RNN 23 is trained such that the target having no ambience change feature is hardly recognized.

The learning is performed very effectively in the image recognition apparatus 1 configured to recognize an object in a moving image obtained by photographing an ambience from the vehicle. Thus, the recognition accuracy (positional detection accuracy and target identification accuracy) can be improved. Further, the accuracy of target linking between frame images can be improved.

Use Example 1 of Image Recognition Apparatus

Figure 11:
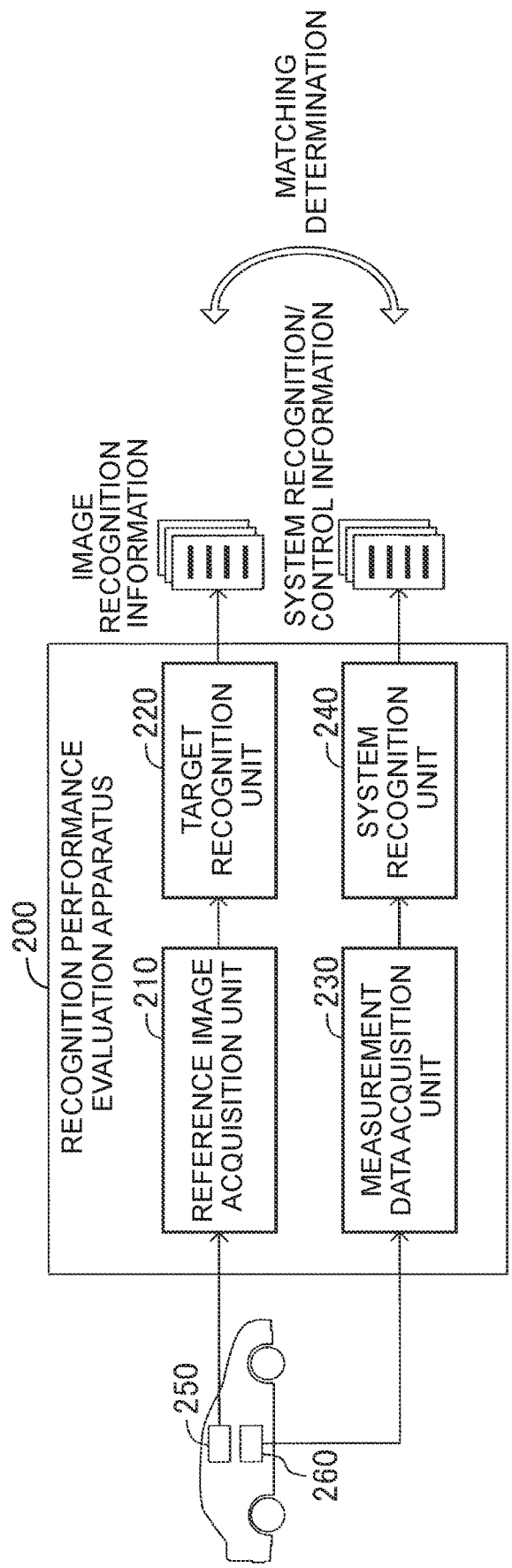
FIG. 11 is a schematic system configuration diagram of a recognition performance evaluation apparatus.

For example, the image recognition apparatus 1 may be used in a recognition performance evaluation apparatus for a vehicle control system. For example, as illustrated in FIG. 11, a recognition performance evaluation apparatus 200 includes a reference image acquisition unit 210, a target recognition unit 220, a measurement data acquisition unit 230, and a system recognition unit 240.

To evaluate the recognition performance of the vehicle control system, a measurement camera 250 is installed in a vehicle to photograph an ambience while the vehicle is traveling on a predetermined course. The reference image acquisition unit 210 acquires a moving image captured by the measurement camera 250 as a reference image. The target recognition unit 220 searches the reference image to recognize and extract a target (for example, a different vehicle or a traffic sign) in the reference image. The image recognition apparatus 1 is used as the target recognition unit 220. The target recognition unit 220 generates and outputs image recognition information on the target recognized from the reference image.

In synchronization with the photographing of the ambience with the measurement camera 250, various types of measurement data are stored in a memory 260. The measurement data is time-series data on measurement values for use in the vehicle control system. The measurement data acquisition unit 230 acquires the measurement data stored in the memory 260. The system recognition unit 240 inputs the measurement data to a model of the vehicle control system, and generates and outputs system recognition/control information indicating how the vehicle control system recognizes driving conditions and surrounding conditions to perform control.

In the recognition performance evaluation apparatus 200, the image recognition apparatus 1 of the embodiment is used to recognize a target (a different vehicle or a traffic sign) in the reference image. Thus, the recognition performance of the vehicle control system can be evaluated appropriately.

As a result, the vehicle control system can be improved by comparing the two types of information (image recognition information and system recognition/control information) output from the recognition performance evaluation apparatus 200 and grasping an unmatched part.

Use Example 2 of Image Recognition Apparatus

Figure 12:
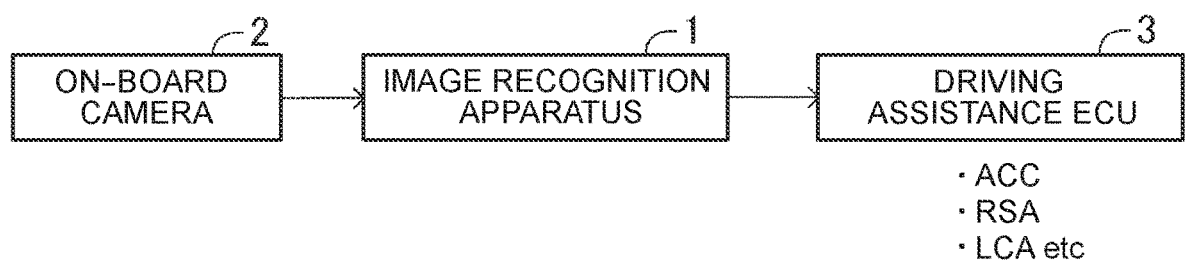
FIG. 12 is a schematic configuration diagram of a driving assistance system.

The image recognition apparatus 1 may be used for detecting an object around a vehicle in a driving assistance system (including an autonomous driving system) for the vehicle. For example, as illustrated in FIG. 12, the image recognition apparatus 1 is connected to an on-board camera 2 configured to photograph an ambience of the vehicle (for example, an area ahead of the vehicle), and acquires a moving image captured by the on-board camera 2 in real time. The image recognition apparatus 1 recognizes a target in the moving image, and supplies target information related to the target (position and identification label) to a driving assistance electronic control unit (ECU) 3.

For example, the driving assistance ECU 3 is an electronic control unit configured to perform driving assistance control such as adaptive cruise control (ACC), road sign assist (RSA), or lane change assist (LCA).

The driving assistance control is performed based on the target information supplied from the image recognition apparatus 1. ACC is driving assistance control for causing the vehicle to follow a preceding vehicle. The driving assistance ECU 3 performs ACC by mainly extracting target information related to the preceding vehicle from the target information supplied from the image recognition apparatus 1.

RSA is driving assistance control for recognizing a traffic sign located ahead of the vehicle and providing information indicated by the traffic sign for a driver. The driving assistance ECU 3 performs RSA by extracting target information related to the traffic sign from the target information supplied from the image recognition apparatus.

LCA is driving assistance control for causing the vehicle to safely change a lane while monitoring surroundings of the vehicle. The on-board camera 2 photographs surroundings of the vehicle including an area behind the vehicle as well as an area ahead of the vehicle, and outputs a moving image to the image recognition apparatus 1. The driving assistance ECU 3 performs LCA by extracting target information related to an obstacle and lane marking lines around the vehicle from the target information supplied from the image recognition apparatus 1.

As described above, the target recognition accuracy of the image recognition apparatus 1 is improved. Thus, the driving assistance control can be performed satisfactorily.

Sampling Interval n for Frame Images

The frame selection unit 10 inputs time-series successive frame images, and selects frame images sampled at the predetermined sampling intervals n from the input frame images. In this case, the frame selection unit 10 acquires information indicating a vehicle speed V of the vehicle, and reduces the sampling interval n as the vehicle speed V increases (increases the sampling interval n as the vehicle speed V decreases). Thus, a delay in target detection can be prevented while reducing a calculation load of image processing.

Although the image recognition apparatus according to this embodiment has been described above, the present disclosure is not limited to the embodiment, and various modifications may be made without departing from the spirit of the present disclosure.

For example, the image recognition apparatus of this embodiment recognizes a target in a moving image obtained by photographing an ambience from a traveling vehicle, but the moving object need not essentially be the vehicle. The present disclosure is also applicable to an image recognition apparatus configured to recognize a target in a moving image obtained by photographing an ambience from a moving object such as a ship, an airplane, or a robot.

In this embodiment, the sampling interval n for frame images is adjusted depending on the vehicle speed V, but may be adjusted depending on a length of a motion vector instead. In this case, the sampling interval n is reduced as the length of the motion vector increases (the sampling interval n is increased as the length of the motion vector decreases). Since the length of the motion vector varies depending on conditions, it is appropriate to use a length of a motion vector under a preset condition.

The target identification method may be implemented by pattern matching or other machine learning.

What is claimed is:

1. An image recognition apparatus configured to extract a target in time-series frame images through image processing for the frame images and output target information related to the target, the frame images being obtained by photographing an ambience from a moving object, the image recognition apparatus comprising a controller configured to:
   perform positional detection and identification for the target in each of the frame images; and
   extract a first target having an ambience change feature with priority over a second target that does not have the ambience change feature, the ambience change feature being a feature about a positional change of the first target that is exhibited when the ambience is photographed from the moving object, the positional change being a positional change of the first target identified in common among the time-series frame images;
   wherein:
   the controller includes a neural network programmed to recognize the target by using information on the time-series frame images; and
   the neural network is programmed to learn through deep learning such that the first target having the ambience change feature is extracted with priority over the second target that does not have the ambience change feature; and
   wherein, when the neural network learns through the deep learning, an error to be output from a loss function for updating a synaptic weight in the neural network is adjusted to be smaller in the first target having the ambience change feature than the second target that does not have the ambience change feature.

2. The image recognition apparatus according to claim 1, wherein the ambience change feature includes a feature of a change in a size of the first target in addition to the feature of the positional change of the target.

3. The image recognition apparatus according to claim 1, wherein the ambience change feature includes a feature that a positional change between the frame images is equal to or smaller than a predetermined amount for a first target recognized at a position near a vanishing point of a motion vector.

4. The image recognition apparatus according to claim 1, wherein the ambience change feature includes a feature that the first target identified in common moves along a straight line.

5. The image recognition apparatus according to claim 4, wherein the ambience change feature includes a feature that the target identified in common among the frame images moves along a straight line connecting the first target in an arbitrary frame image and a vanishing point of a motion vector.

6. The image recognition apparatus according to claim 4, wherein the ambience change feature includes a feature that a change in a movement interval of the first target identified in common has a predetermined regularity.

7. The image recognition apparatus according to claim 4, wherein the ambience change feature includes a feature that a change in a size of the first target identified in common has a predetermined regularity.

8. The image recognition apparatus according to claim 1, wherein the controller is configured to:
   input the time-series frame images obtained by photographing the ambience from the moving object;
   set, as a target for the image processing, a frame image extracted at a predetermined sampling interval from the input frame images; and
   adjust the sampling interval such that the sampling interval increases as a moving speed of the moving object decreases.

9. The image recognition apparatus according to claim 1, wherein the moving object is a vehicle.

10. An image recognition apparatus comprising a controller configured to:
    perform positional detection and identification for a target in each of time-series frame images obtained by photographing an ambience from a moving object;
    extract the target in the frame images through image processing for the frame images, the controller being configured to extract a first target having an ambience change feature with priority over a second target, the ambience change feature being a feature about a positional change of the target that is needed for the target identified by the controller to be estimated as a common target among the time-series frame images when the ambience is photographed from the moving object; and
    output target information related to the first target or the second target;
    wherein:

the controller includes a neural network configured to recognize the target by using information on the time-series frame images; and the neural network is configured to learn through deep learning such that the first target having the ambience change feature is extracted with priority over the second target that does not have the ambience change feature; and wherein, when the neural network learns through the deep learning, an error to be output from a loss function for updating a synaptic weight in the neural network is adjusted to be smaller in the first target having the ambience change feature than the second target that does not have the ambience change feature.

11. The image recognition apparatus according to claim 10, wherein the moving object is a vehicle.

* * * * *